(12) United States Patent
Li

(10) Patent No.: US 7,701,088 B2
(45) Date of Patent: Apr. 20, 2010

(54) SUPPLY VOLTAGE SELECTOR

(75) Inventor: Ning Li, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 162 days.

(21) Appl. No.: 11/412,861

(22) Filed: Apr. 28, 2006

(65) Prior Publication Data

US 2007/0075588 A1 Apr. 5, 2007

Related U.S. Application Data

(60) Provisional application No. 60/722,449, filed on Oct. 3, 2005.

(51) Int. Cl.
*H02J 1/00* (2006.01)
*H02J 3/00* (2006.01)

(52) U.S. Cl. .................................. 307/80

(58) Field of Classification Search .......... 307/80, 307/115
See application file for complete search history.

(56) References Cited

U.S. PATENT DOCUMENTS

| 5,739,596 | A | * | 4/1998 | Takizawa et al. | ......... 307/66 |
| 6,091,617 | A | * | 7/2000 | Moran | ......... 363/142 |
| 6,600,239 | B2 | * | 7/2003 | Winick et al. | ......... 307/85 |
| 2004/0217653 | A1 | * | 11/2004 | Neidorff | ......... 307/80 |
| 2006/0076837 | A1 | * | 4/2006 | Gotoh et al. | ......... 307/107 |

* cited by examiner

*Primary Examiner*—Albert W Paladini
*Assistant Examiner*—Carlos Amaya

(57) ABSTRACT

An active diode includes a plurality of transistors and a built-in offset voltage. The built-in offset voltage size can be determined by sizing of at least one of the plurality of transistors to prevent supply current flow from one supply source into another supply source, thereby preventing current flow from a higher voltage source to a lower voltage source.

16 Claims, 4 Drawing Sheets

SUPPLY VOLTAGE SELECTOR

BACKGROUND OF THE INVENTION

1. Field of the Invention

The present invention relates to an apparatus and method of selecting a highest voltage supply in a system where multiple voltage supply sources are present, and more particularly to a system and method wherein an active diode with built-in offset is used to select the highest voltage supply in the system.

2. Description of the Related Art

A computer chip, used mostly in Bluetooth involved applications, requires low power. In a system, using the computer chip requiring low power, where multiple supplies are present, there is a need to select the highest supply from the different types of voltage sources. For example, in a cell phone which includes a primary battery, a secondary battery, a backup battery and a charger supply, there is a need to select the highest supply from the different voltage sources.

In a switching regulator with power management where the computer chip requiring low power is used, one problem is high voltage is needed although such a system also needs low voltage generated. Thus, with two supply sources, a circuit in the switching regulator needs to figure out which one of the supply sources is the highest supply source. Furthermore, even though the circuit needs to connect to the highest supply source, there is no initial power to the circuit, for example to a battery selector. So, for example, if there is a battery A and a battery B in the switching regulator, the battery selector cannot automatically select battery A because battery A may not be plugged in. The battery selector also cannot automatically select battery B. Additionally, battery A and battery B cannot both be connected to the battery selector because this may cause a short. Furthermore, if the circuit connects to one source permanently, the circuit cannot dynamically connect to another higher voltage source. Thus, the circuit has to dynamically figure out which supply source to connect to and when the voltage of the connected source is decreasing, the circuit has to determine when to dynamically switch to the other source with a higher voltage.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
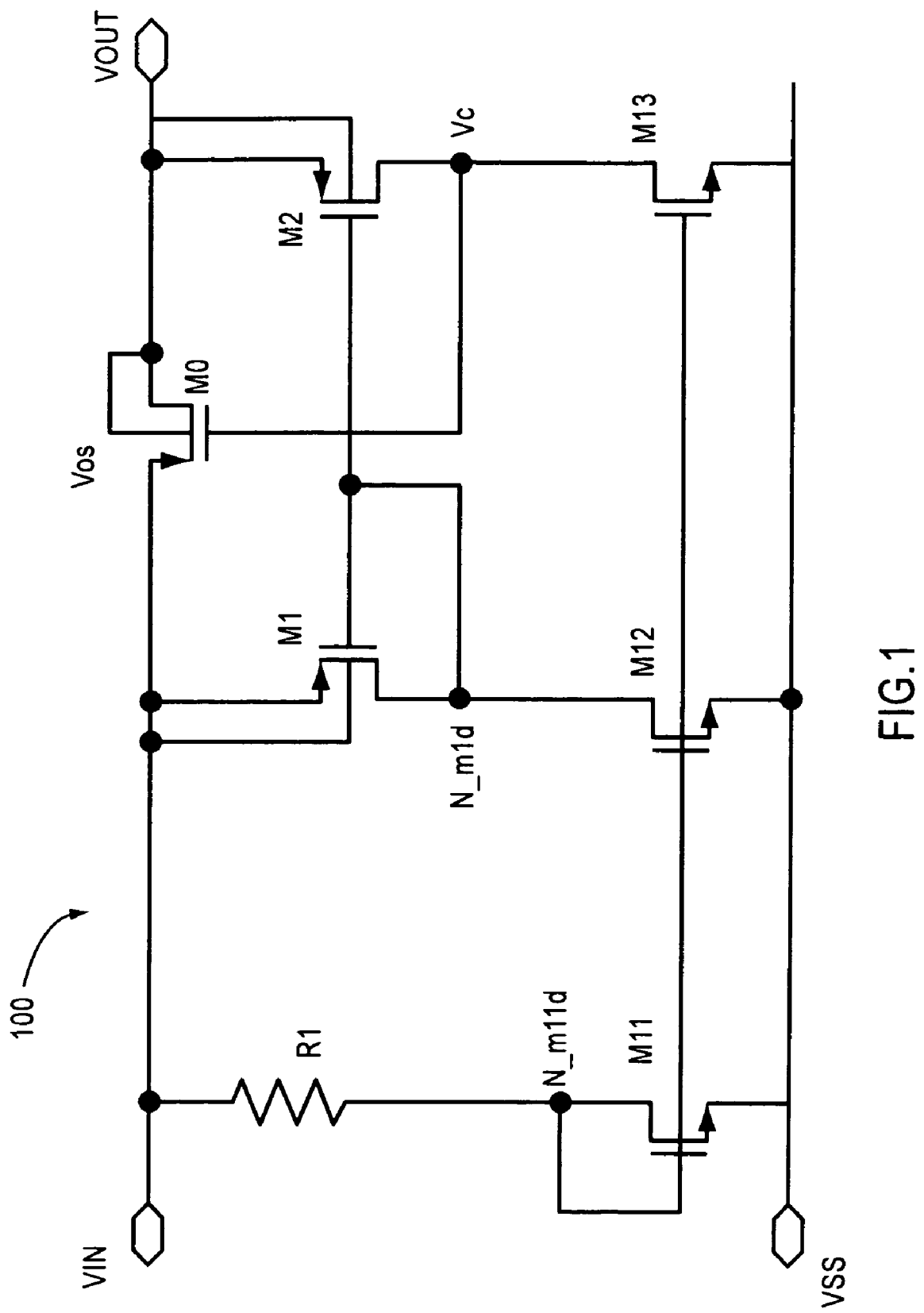
FIG. 1 illustrates an active diode 100 in which an embodiment of the present invention may be implemented.

FIG. 1 illustrates an active diode 100 in which an embodiment the present invention may be implemented. Active diode 100 includes multiple transistors MO-M2 and M11-M13 implemented in a complementary metal oxide semiconductor (CMOS) integrated circuit design. Active diode 100 also implements a built-in offset voltage that can be well controlled, wherein the built-in offset voltage size can be determined by sizing of transistors to prevent supply current flow from one supply source into other supply sources. Thus, active diode 100 prevents current flow from the higher voltage source to the lower voltage source.

The active diode is also self-biased. The bias current is controlled by the resistor R1, the transistor M11, and the supply voltage. The current is given by $(V_{in}-V_{GS(M11)})/R1$, where Vin is the incoming supply voltage, $V_{GS(M11)}$ is the gate to source voltage, and R1 is the bias control resistor. It should be noted that R1 is one form of bias and that other forms of bias may be used in the present invention. An advantage of the present invention is to be self-biased so that the diode does not need an extra supply.

FIG. 1 illustrates voltage (Vin) entering active diode 100 and a voltage (Vout) exiting active diode 100. Transistor MO determines whether or not to be connected between the input and output, wherein when there is enough voltage drop between Vin and Vout, the transistor MO, controlled by control node Vc, will be turned on. Transistor MO is controlled by the current comparison of transistors M12 and M13. Transistors M2 and M1 create the built-in offset voltage. To simplify the design, M12 can be sized to be the same as M13, and the length for M1 and M2 are the same. When M1 and M2 are biased in a subthreshold region, the offset voltage can be estimated as $Vos=n*Ut*\log_e(W_2/W_1)$, where n and Ut are constant, and W2 and W1 are the width of the M2 and M1 transistors. When the built-in offset voltage is reached from Vin to Vout, transistor MO is turned on. Thus, according to the present invention, the built-in offset voltage is used to prevent two supplies in the system from being shorted together.

Figure 2:
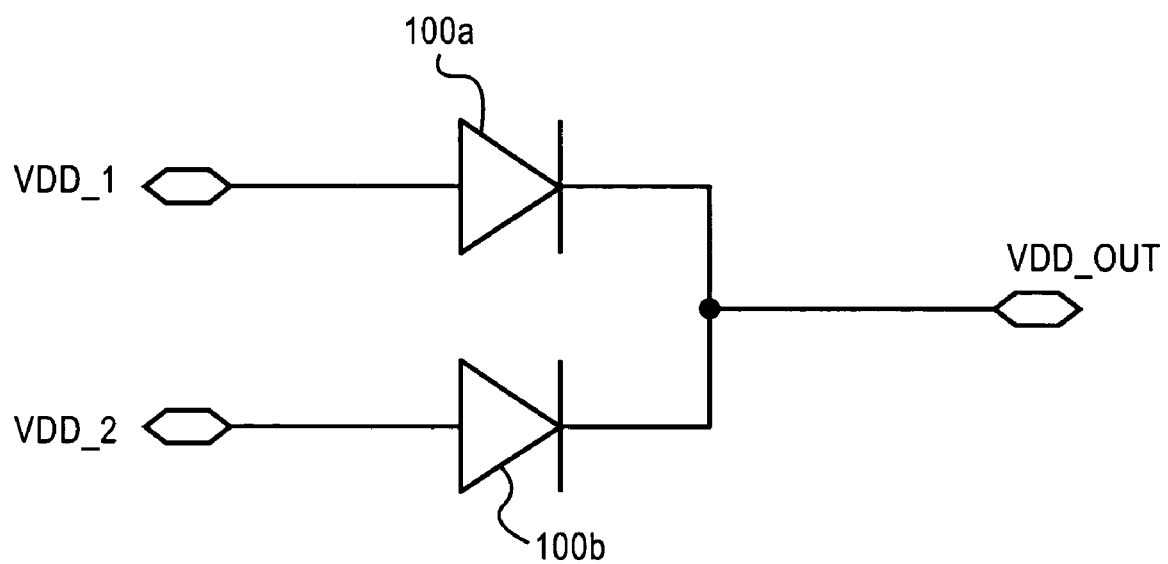
FIG. 2 illustrates an embodiment of the present invention, wherein the higher voltage source is selected.

FIG. 2 illustrates an embodiment of the present invention, wherein the higher voltage source is selected. As shown in FIG. 2, there are two incoming voltage supplies, VDD_1 and VDD_2 and two active diodes 100a and 100b with built-in offset voltages. The system is able to dynamically choose the higher voltage source using the built-in offset voltage.

For example, in FIG. 2, if the voltage entering VDD_1 is 1.5V and the voltage entering VDD_2 is 1.8V, the system selects VDD_2 as its supply source. The output voltage VDD_OUT=VDD_2−Vos, where Vos is the offset voltage of the active diode.

Figure 3:
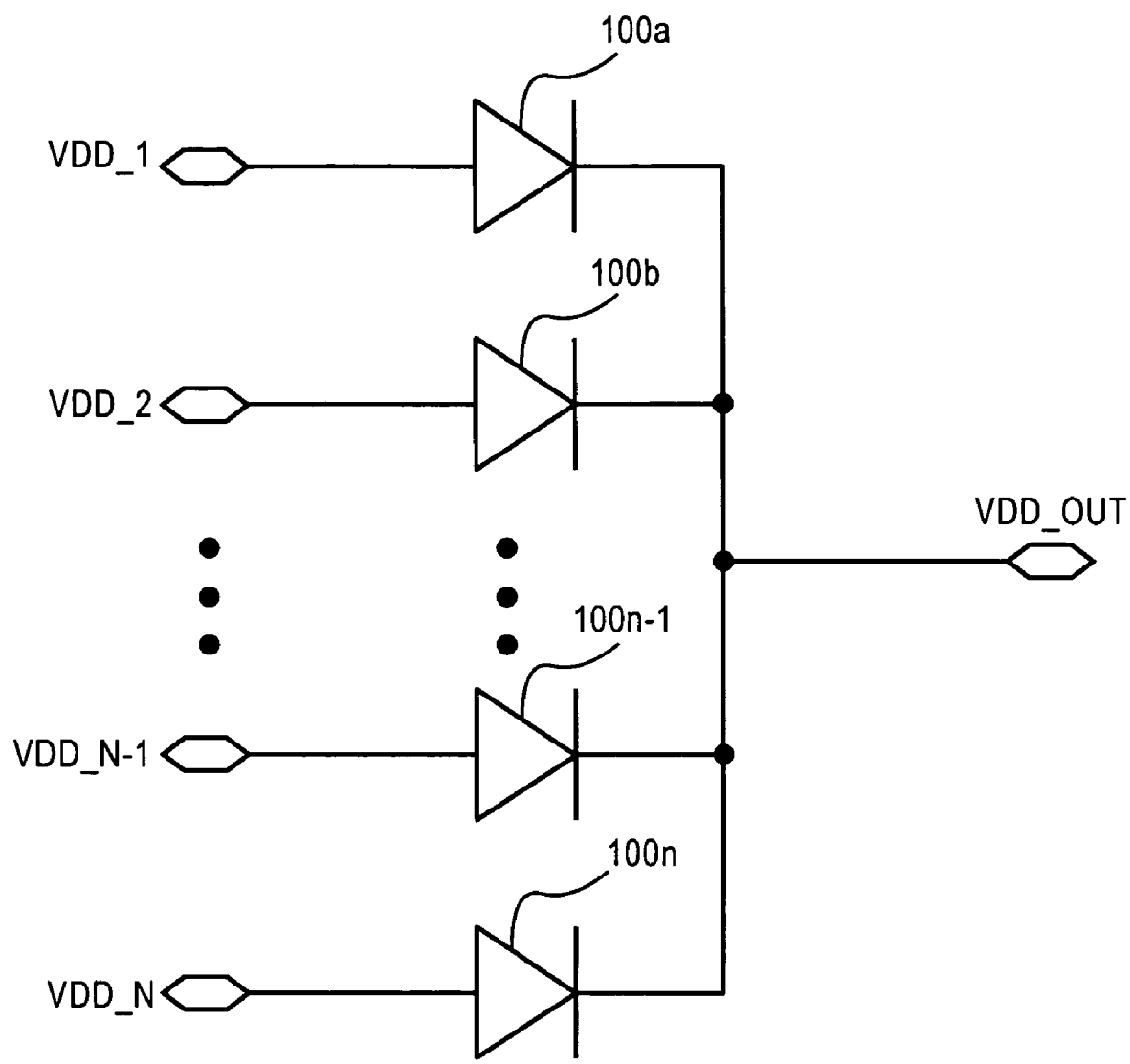
FIG. 3 illustrates another embodiment of the present invention, wherein multiple (N) voltage sources are provided.

FIG. 3 illustrates another embodiment of the present invention, wherein multiple (n) voltage sources are provided. As shown in FIG. 3, there are n incoming voltage supplies, VDD_1 to VDD_n and n active diodes 100a to 100n, each with a built-in offset. As shown in FIG. 3, the number of active diodes is used determine the number of selections that may be made by the system that implements the present invention.

Figure 4B:
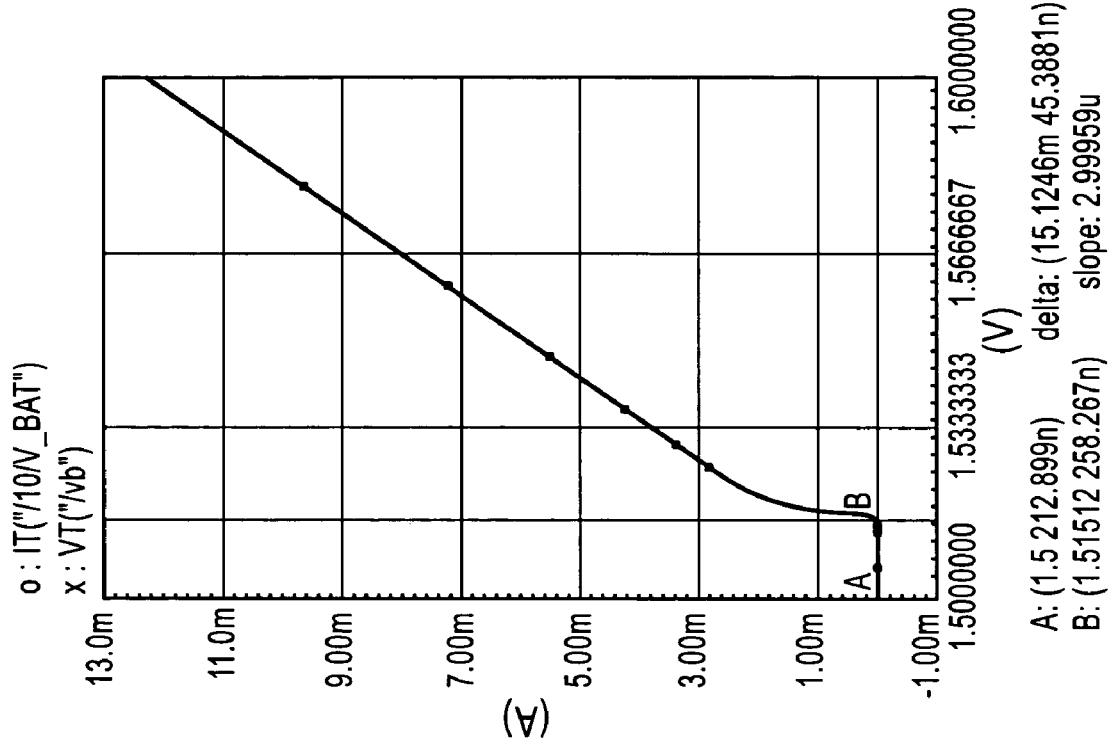
FIG. 4 illustrates the characteristics of the diode I-V curve.
Figure 4A:
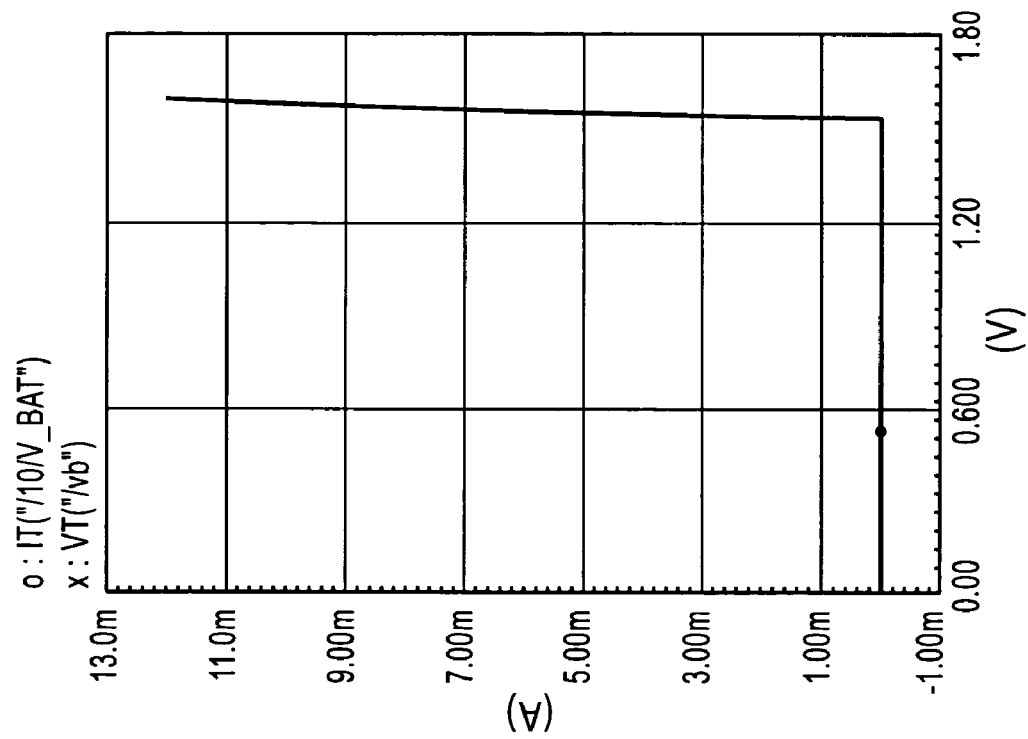

FIG. 4 illustrates the characteristics of the diode I-V curve. In FIG. 4, the input supply varies from 0 to 1.6V, and the VDD-OUT is fixed at 1.5V. Thus, when the incoming voltage is below 1.5+Vos=1.515V, (Vos=0.015V in this case), there is nearly no current. However, after 1.515V the current goes up.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. It would also be within the scope of the invention to implement the disclosed elements of the invention in discrete electronic components, thereby taking advantage of the functional aspects of the invention without maximizing the advantages through the use of a single semiconductor substrate.

The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:

1. An active diode circuit comprising:
   an input voltage terminal;
   an output voltage terminal;
   a power supply selection device coupled between the input voltage terminal and the output voltage terminal, the power supply selection device being configured to selectively couple the input voltage terminal with the output voltage terminal; and
   an offset voltage circuit coupled with the power supply selection device, the offset voltage circuit being configured to provide an offset voltage to the power supply selection device, wherein the power supply selection device selectively couples the input voltage terminal with the output voltage terminal based, at least in part, on the offset voltage and the offset voltage provided by the offset voltage circuit prevents current flow into the active diode circuit through the output voltage terminal.

2. The active diode circuit of claim 1, further comprising a current comparison circuit coupled with the offset voltage circuit, the current comparison circuit being configured to provide a plurality of currents to the offset voltage circuit, wherein the offset voltage of the offset voltage circuit is based, at least in part, on the plurality of currents.

3. The active diode circuit of claim 2, wherein the power supply selection device comprises a transistor having:
   a source terminal coupled with the input voltage terminal and the offset voltage circuit;
   a drain terminal coupled with the output voltage terminal and the offset voltage circuit; and
   a gate terminal coupled with the offset voltage circuit and the current comparison circuit.

4. The active diode circuit of claim 2, wherein:
   the current comparison circuit comprises a first transistor and a second transistor, the first and second transistors being coupled in parallel with each other, each of the first and second transistors having a source terminal coupled with an electrical ground terminal;
   the offset voltage circuit comprises a third transistor and a fourth transistor, wherein:
      the third transistor comprises a drain terminal coupled with a drain terminal of the first transistor, a source terminal coupled with the input voltage terminal and a gate terminal coupled with the drain terminal of the third transistor; and
      the fourth transistor comprises a drain terminal coupled with a drain terminal of the second transistor, a source terminal coupled with the output voltage terminal and a gate terminal coupled with the gate terminal and the drain terminal of the third transistor; and
   the power supply selection device comprises a fifth transistor having:
      a source terminal coupled with the input voltage terminal and the source terminal of the third transistor;
      a drain terminal coupled with the output voltage terminal and the source terminal of the fourth transistor; and
      a gate terminal coupled with the drain terminal of the second transistor and the drain terminal of the fourth transistor.

5. The active diode circuit of claim 2, further comprising a bias circuit coupled with the input voltage terminal and the current comparison circuit, the bias circuit being configured to provide a bias current to the active diode.

6. The active diode circuit of claim 5, wherein the bias circuit comprises:
   a resistor having a first terminal coupled with the input voltage terminal; and
   a transistor having a drain terminal coupled with a second terminal of the resistor, a source terminal coupled with an electrical ground terminal and a gate terminal coupled with the drain terminal and the current comparison circuit.

7. The active diode of claim 6, wherein the bias current is given by $(V_{in}-V_{GS})/R$, wherein Vin is a voltage applied to the input voltage terminal, $V_{GS}$ is the gate-to-source voltage of the transistor and R is the resistance of the resistor.

8. The active diode circuit of claim 1, further comprising a bias circuit coupled with the input voltage terminal.

9. The active diode circuit of claim 1, wherein the offset voltage circuit comprises at least two transistors and the offset voltage is based, at least in part, on respective widths of the at least two transistors.

10. A system for selecting a power supply voltage from a plurality of power supply voltages, the system comprising:
    a first active diode including a first input voltage terminal and a first output voltage terminal; and
    a second active diode including a second input voltage terminal and a second output voltage terminal, the second output voltage terminal being coupled with the first output voltage terminal at a common output voltage terminal, wherein each active diode comprises:
       a power supply selection device coupled between the respective input voltage terminal and the respective output voltage terminal, the power supply selection device being configured to selectively couple the input voltage terminal with the output voltage terminal; and
       an offset voltage circuit coupled with the power supply selection device, the offset voltage circuit being configured to provide an offset voltage to the power supply selection device, wherein the power supply selection device selectively couples the input voltage terminal with the output voltage terminal based, at least in part, on the offset voltage and the offset voltage provided by the offset voltage circuit prevents current flow into the active diode circuit through its respective output voltage terminal,
    wherein the system is configured to:
       select a higher supply voltage from a first supply voltage applied to the first input voltage terminal and a second supply voltage applied to the second input voltage terminal; and
       apply the higher supply voltage to the common output voltage terminal.

11. The system of claim 10, wherein each active diode comprises a current comparison circuit coupled with the offset voltage circuit, the current comparison circuit being configured to provide a plurality of currents to the offset voltage circuit and the respective offset voltage is based, at least in part, on the plurality of currents.

12. The system of claim 10, wherein each active diode further comprises a bias circuit configured to provide a respective bias current to the respective active diode.

13. The system of claim 12, wherein each bias circuit comprises a resistor and a transistor coupled in series between the respective input voltage terminal and an electrical ground terminal.

14. The system of claim 13, wherein the bias current of each active diode is given by $(V_{in}-V_{GS})/R$, wherein Vin is a voltage applied to the respective input voltage terminal, $V_{GS}$ is the gate-to-source voltage of the respective transistor, and R is the resistance of the respective resistor.

15. The system of claim 10, wherein each offset voltage circuit comprises at least two transistors and the respective offset voltage is based, at least in part, on respective widths of the at least two transistors.

16. An active diode comprising:
an input voltage terminal;
an output voltage terminal;
a power supply selection device coupled between the input voltage terminal and the output voltage terminal, the power supply selection device being configured to selectively couple the input voltage terminal with the output voltage terminal;
an offset voltage circuit coupled with the power supply selection device, the offset voltage circuit being configured to provide an offset voltage to the power supply selection device;
a current comparison circuit coupled with the offset voltage circuit, the current comparison circuit being configured to provide a plurality of currents to the offset voltage circuit, such that the offset voltage is based, at least in part, on the plurality of currents; and
a bias circuit coupled with the input voltage terminal and the current comparison circuit, the bias circuit being configured to provide a bias current to the active diode,
wherein the power supply selection device selectively couples the input voltage terminal with the output voltage terminal based, at least in part, on the offset voltage and the offset voltage provided by the offset voltage circuit prevents current flow into the active diode circuit through the output voltage terminal.

* * * * *